United States Patent
Wang et al.

(10) Patent No.: US 12,230,024 B2
(45) Date of Patent: Feb. 18, 2025

(54) SYSTEMS AND TECHNIQUES FOR RETRAINING MODELS FOR VIDEO QUALITY ASSESSMENT AND FOR TRANSCODING USING THE RETRAINED MODELS

(71) Applicant: Google LLC, Mountain View, CA (US)

(72) Inventors: Yilin Wang, Sunnyvale, CA (US);
Hossein Talebi, San Jose, CA (US);
Peyman Milanfar, Menlo Park, CA (US); Feng Yang, Sunnyvale, CA (US);
Balineedu Adsumilli, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 367 days.

(21) Appl. No.: 17/762,289

(22) PCT Filed: Nov. 26, 2019

(86) PCT No.: PCT/US2019/063191
§ 371 (c)(1),
(2) Date: Mar. 21, 2022

(87) PCT Pub. No.: WO2021/107922
PCT Pub. Date: Jun. 3, 2021

(65) Prior Publication Data
US 2022/0415039 A1    Dec. 29, 2022

(51) Int. Cl.
*G06V 10/98*    (2022.01)
*G06N 3/045*    (2023.01)
(Continued)

(52) U.S. Cl.
CPC ........... *G06V 10/993* (2022.01); *G06N 3/045* (2023.01); *G06V 10/82* (2022.01); *G06V 20/46* (2022.01)

(58) Field of Classification Search
CPC ............ G06N 3/02–105; G06V 10/82; G06V 10/993; G06V 20/46; G06V 10/40;
(Continued)

(56) References Cited

U.S. PATENT DOCUMENTS 9,813,706 B1 * 11/2017 Lin ........................ H04N 19/40
2009/0073266 A1 * 3/2009 Abdellaziz Trimeche ..................
H04N 1/00294
348/180

(Continued)

OTHER PUBLICATIONS

Liu, Xialei, Joost Van De Weijer, and Andrew D. Bagdanov. "Rankiqa: Learning from rankings for no-reference image quality assessment." Proceedings of the IEEE international conference on computer vision. 2017. (Year: 2017).*

(Continued)

*Primary Examiner* — Sean M Conner
*Assistant Examiner* — Stefano Anthony Dardano
(74) *Attorney, Agent, or Firm* — Young Basile Hanlon & MacFarlane, P.C.

(57) ABSTRACT

A trained model is retrained for video quality assessment and used to identify sets of adaptive compression parameters for transcoding user generated video content. Using transfer learning, the model, which is initially trained for image object detection, is retrained for technical content assessment and then again retrained for video quality assessment. The model is then deployed into a transcoding pipeline and used for transcoding an input video stream of user generated content. The transcoding pipeline may be structured in one of several ways. In one example, a secondary pathway for video content analysis using the model is introduced into the pipeline, which does not interfere with the ultimate output of the transcoding should there be a network or other issue. In another example, the model is introduced as a library within
(Continued)

the existing pipeline, which would maintain a single pathway, but ultimately is not expected to introduce significant latency.

20 Claims, 12 Drawing Sheets

(51) Int. Cl.
  *G06V 10/82* (2022.01)
  *G06V 20/40* (2022.01)
(58) Field of Classification Search
  CPC .... G06V 10/98; H04N 19/102; H04N 19/154; H04N 19/172; H04N 19/40
  See application file for complete search history.

(56) References Cited

U.S. PATENT DOCUMENTS

2018/0160161 A1* 6/2018 Reznik ........... H04N 21/234309
2019/0122115 A1* 4/2019 Wang ................... G06V 10/993

OTHER PUBLICATIONS

Li, Xiaowei, Yi Cui, and Yuan Xue. "Towards an automatic parameter-tuning framework for cost optimization on video encoding cloud." International Journal of Digital Multimedia Broadcasting 2012 (2012). (Year: 2012).*

Dong, Xingping, and Jianbing Shen. "Triplet loss in siamese network for object tracking." Proceedings of the European conference on computer vision (ECCV). 2018. (Year: 2018).*

He, Kaiming, et al. "Spatial pyramid pooling in deep convolutional networks for visual recognition." IEEE transactions on pattern analysis and machine intelligence 37.9 (2015): 1904-1916. (Year: 2015).*

Lee, Dayoung, Jungwoo Lee, and Minseok Song. "Video quality adaptation for limiting transcoding energy consumption in video servers." IEEE Access 7 (2019): 126253-126264. (Year: 2019).*

Shan, Wei, et al. "Two-stage transfer learning of end-to-end convolutional neural networks for webpage saliency prediction." Intelligence Science and Big Data Engineering: 7th International Conference, IScIDE 2017, Dalian, China, Sep. 22-23, 2017, Proceedings 6. (Year: 2017).*

Talebi, Hossein, and Peyman Milanfar. "Learned perceptual image enhancement." 2018 IEEE international conference on computational photography (ICCP). IEEE, 2018. (Year: 2018).*

Hossein Talebi et al., "Learned Perceptual Image Enhancement"; ARXIV.org; Cornell University Library; Dec. 7, 2017; abstract section 1.2 A Large-Scale Database for Aesthetic Visual Analysis; 10 pgs.

Ahmad I et al., "Video Transcoding: An Overview of Various Techniques and Research Issues", A IEEE Transactions On Multimedia, IEEE Service Center, Piscataway, NJ, US, vol. 7, No. 5, Oct. 1, 2005 (Oct. 1, 2005), pp. 793-804.

Hyungsuk Oh et al., "Video Processing for Human Perceptual Visual Quality-Oriented Video Coding", IEEE Transactions On Image Processing, IEEE Service Center, Piscataway, NJ, US, vol. 22, No. 4, Apr. 1, 2013 (Apr. 1, 2013), pp. 1526-1535.

International Search Report and Written Opinion of International Application No. PCT/US2019/063191 dated May 12, 2020, 11 pgs.

* cited by examiner

SYSTEMS AND TECHNIQUES FOR RETRAINING MODELS FOR VIDEO QUALITY ASSESSMENT AND FOR TRANSCODING USING THE RETRAINED MODELS

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for using transfer learning to retrain and deploy a machine learning model for video quality assessment according to an implementation of this disclosure comprises retraining a machine learning model to produce a second machine learning model for technical content assessment using a first retraining data set. The machine learning model is initially trained for image object detection. The method further comprises retraining the second machine learning model to produce a third machine learning model for video quality assessment using a second retraining data set different from the first retraining data set. The second retraining data set corresponds to first user generated video content. Each sample of the second retraining data set includes a pair of video frames including a first video frame at a first quality level and a second video frame at a second quality level. The method further comprises deploying the third machine learning model for inference processing of second user generated video content.

In some implementations of the method, the method further comprises producing the second retraining data set by extracting video frames from each of a first set of the first user generated video content and a second set of the first user generated video content and pairing each of the video frames extracted from the first set of the first user generated content with each of one or more video frames extracted from the second set of the first user generated content.

In some implementations of the method, retraining the machine learning model for video quality assessment using the second retraining data set comprises generating rank loss information representing rankings of quality measures of video frames of the second retraining data set and training the machine learning model to recognize different video content quality levels using the rank loss information.

In some implementations of the method, generating the rank loss information comprises receiving, for each pair of video frames of the second retraining data set, an indication of which of the first video frame or the second video frame represents a higher value of one or more image assessment criteria and generating the rank loss information for the second retraining data set using the indications received for each of the pairs of video frames.

In some implementations of the method, the indications for each of the pairs of video frames are produced using an automated psychovisual image assessment model.

In some implementations of the method, training the machine learning model to recognize the different video content quality levels using the rank loss information comprises training the machine learning model using the rank loss information and using cross entropy loss information produced for each pair of video frames of the second retraining data set.

In some implementations of the method, the machine learning model is a convolutional neural network and retraining the machine learning model for video quality assessment using the second retraining data set comprises using spatial pyramid pooling to train the machine learning model to recognize different sizes of video frames for the video quality assessment.

In some implementations of the method, the first video frame and the second video frame of at least some of the pairs of video frames include different image data.

A method for inference processing of an input video stream using a machine learning model retrained for video quality assessment according to an implementation of this disclosure comprises receiving the input video stream, wherein the input video stream includes video frames at an unspecified quality level. The method further comprises using the machine learning model to determine a quality level of the video frames of the input video stream. The method further comprises selecting a set of one or more adaptive compression parameters to use for transcoding the input video stream based on the quality level determined using the machine learning model. The set of the one or more adaptive compression parameters is one of a plurality of sets of adaptive compression parameters. Each of the sets of adaptive compression parameters corresponds to a different quality level to use for transcoding. The method further comprises transcoding the input video stream according to the selected set of the one or more adaptive compression parameters.

In some implementations of the method, transcoding the input video stream according to the selected set of adaptive compression parameters comprises adjusting an initial constant rate factor for the input video stream according to the selected set of adaptive compression parameters.

In some implementations of the method, the one or more adaptive compression parameters include parameters corresponding to a constant rate factor, a minimum bitrate, and a maximum bitrate.

In some implementations of the method, the machine learning model is produced using first user generated video content and the input video stream is second user generated video content.

A non-transitory computer readable medium of this disclosure has instructions stored thereon, the instructions configured to cause one or more processors to perform any or all of the methods set out above or described elsewhere herein.

A system according to an implementation of this disclosure comprises one or more memories storing machine readable instructions. The machine readable instructions are configured to cause one or more processors of the system to perform any or all of the methods set out above or described elsewhere herein.

In some implementations of the system, the system is a system for performing inference processing of an input video stream using a machine learning model retrained for video quality assessment. The system is configured to provide a transcoding pipeline that receives the input video stream and transcodes the input video stream to produce transcoded content. The transcoding pipeline includes a content analysis stage and a transcoding stage. The video analysis stage uses the machine learning model to determine the quality level of the video frames of the input video stream and to select the set of the one or more adaptive compression parameters based on the quality level. The transcoding stage transcodes the input video stream into the transcoded content according to the selected set of the one or more adaptive compression parameters.

In some implementations of the system, the transcoding pipeline includes a mezzanine transcoding stage that transcodes the input video stream to a mezzanine format. The video analysis stage and the mezzanine transcoding stage each receives the input video stream. The video analysis stage completes processing of the input video stream before the mezzanine transcoding stage completes processing of the input video stream.

In some implementations of the system, the transcoding stage uses output of the video analysis stage and output of the mezzanine transcoding stage to transcode the input video stream into the transcoded content.

In some implementations of the system, the transcoding stage includes the video analysis stage.

In some implementations of the system, the video analysis stage is used as a library for target transcoding by the transcoding stage.

In some implementations of the system, the video analysis stage processes at least some of the input video stream to determine whether the quality level of the video frames of the input video stream meets a threshold.

In some implementations of the system, responsive to a determination that the quality level of the video frames of the input video stream meets the threshold, default compression parameters are used for transcoding the input video stream, and, responsive to a determination that the quality level of the video frames of the input video stream does not meet the threshold, the default compression parameters are adjusted for transcoding the input video stream.

In some implementations of the system, responsive to the determination that the quality level of the video frames of the input video stream does not meet the threshold, the default compression parameters are adjusted by increasing a constant rate factor for the input video stream.

These and other aspects of this disclosure are disclosed in the following detailed description of the implementations, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Figure 1:
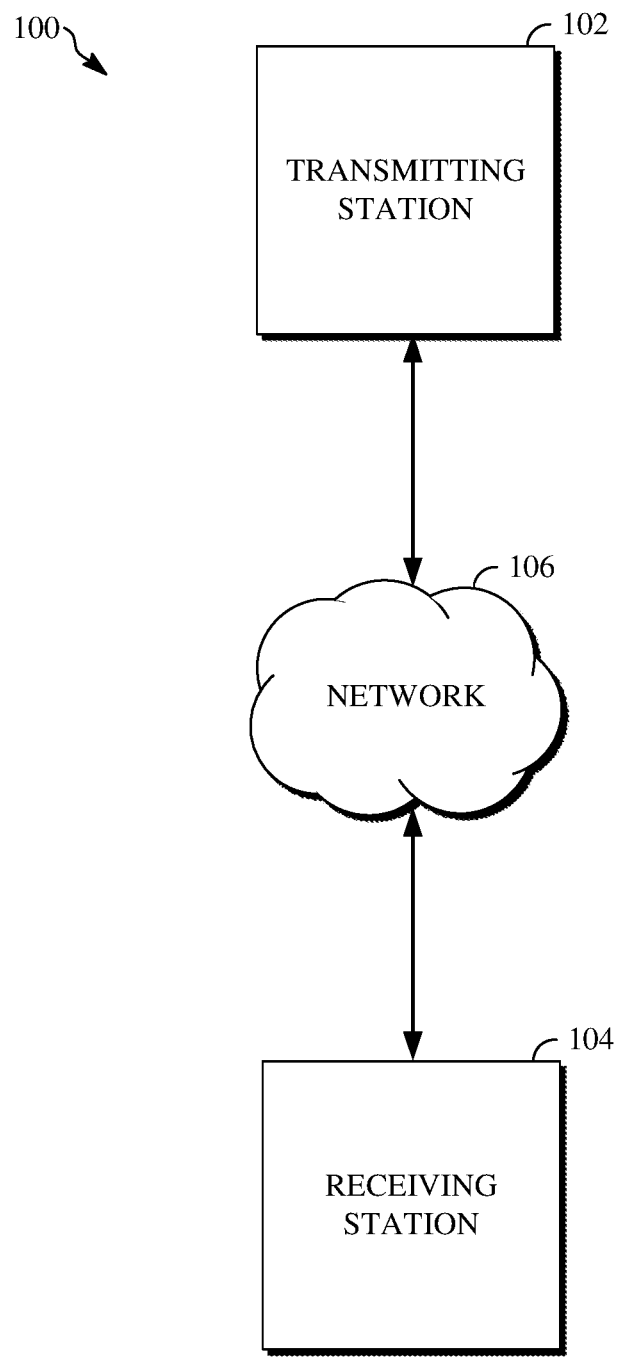
FIG. 1 is a schematic of an example of a video encoding and decoding system.

Video compression schemes may include breaking respective images, or frames, into smaller portions, such as blocks, and generating a compressed bitstream using techniques to limit the information included for respective blocks in the output. The compressed bitstream can be decoded to re-create the source images from the limited information. Typical video compression techniques include reducing the bitrate of a video stream, such as to reduce transmission costs for video hosting and serving platforms. Compression may be performed as part of or otherwise in connection with the transcoding of video content, such as to convert aspects of the video content from one format to another. For example, when user generated video content is uploaded to a video hosting platform, video stream representing the user generated content may be compressed and transcoded for later viewing on the video hosting platform.

Conventional transcoding pipelines transcode video content using fixed values of compression parameters, such as a constant rate factor (CRF), a minimum bitrate, and a maximum bitrate. However, given the large variance in the quality (e.g. bitrate, resolution, etc.) of user generated video content, the use of fixed compression parameters can result in a large variance in the quality of the resulting transcoded video content and may even be an unnecessary expenditure of computing resources. For example, the use of fixed value compression parameters may result in unacceptable quality reduction, such as during the transcoding of high quality input video streams. In another example, the use of fixed value compression parameters may result in wasted processing and wasted bits in preparing the resulting transcoded video content, such as during the transcoding of low quality input video streams.

It would therefore be beneficial to transcode video content using non-fixed, or adaptive, compression parameters. Since adaptive compression parameters are based on the quality of the video content, determining the adaptive compression parameters to use for a given input video stream includes assessing the quality of the input video stream, which quality may, for example, relate to artifacts which will be or are likely to be introduced within the input video stream during a compression thereof. However, given the large variance in both the substance (e.g., objects, motion, etc.) within and quality of video content, it would be beneficial to produce a model configured for video quality assessment which can be used to process large variances in user generated video content. Conventional transcoding pipelines lack such a model and thus suffer from an inability to reliably determine the quality of an input video stream.

Implementations of this disclosure address problems such as these by producing a model which has been retrained for video quality assessment and using the model to identify sets of adaptive compression parameters to use for transcoding user generated content in the form of videos. Using transfer learning, the model, which is initially trained for image object detection, is retrained for technical content assessment and then again retrained for video quality assessment. The transfer learning leverages the training at each stage to produce a model which can assess the quality of video content in part by detecting objects within the video content and by technically assessing the content of the video.

The model is then deployed into a transcoding pipeline and used for transcoding an input video stream of user generated content. The transcoding pipeline to which the model is deployed may be structured in one of several ways. In one example, a secondary pathway for video content analysis using the model is introduced into the pipeline, which does not interfere with the ultimate output of the transcoding should there be some kind of network or other issue. In another example, the model is introduced as a library within the existing pipeline, which would maintain a single pathway, but ultimately is not expected to introduce significant latency.

Advantages of the techniques described herein include the ability to produce a model for video quality assessment and the ability to use the produced model to identify adaptive compression parameters to use for transcoding an input video stream. In particular, the techniques described herein enable a model to be generated that is configured to assess the quality of video frames of user generated content, which could be used, for example, as part of or otherwise in connection with a process for transcoding an input video stream, such as which may be uploaded to a video hosting platform.

As used herein, the model may be a machine learning model. For example, the machine learning model may be or include one or more of a neural network (e.g., a convolutional neural network, recurrent neural network, or other neural network), decision tree, vector machine, Bayesian network, genetic algorithm, deep learning system separate from a neural network, or other machine learning model. In some cases, the machine learning model may be of an unconventional structure or otherwise demonstrate unconventional functionality. For example, the machine learning model can be a pairwise convolutional neural network model that takes multiple (e.g., two) inputs. This is different from a conventional convolutional neural network, which instead takes a single input.

Further details of techniques for retraining models for video quality assessment and for transcoding using the retrained models are described herein with initial reference to a system in which they can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
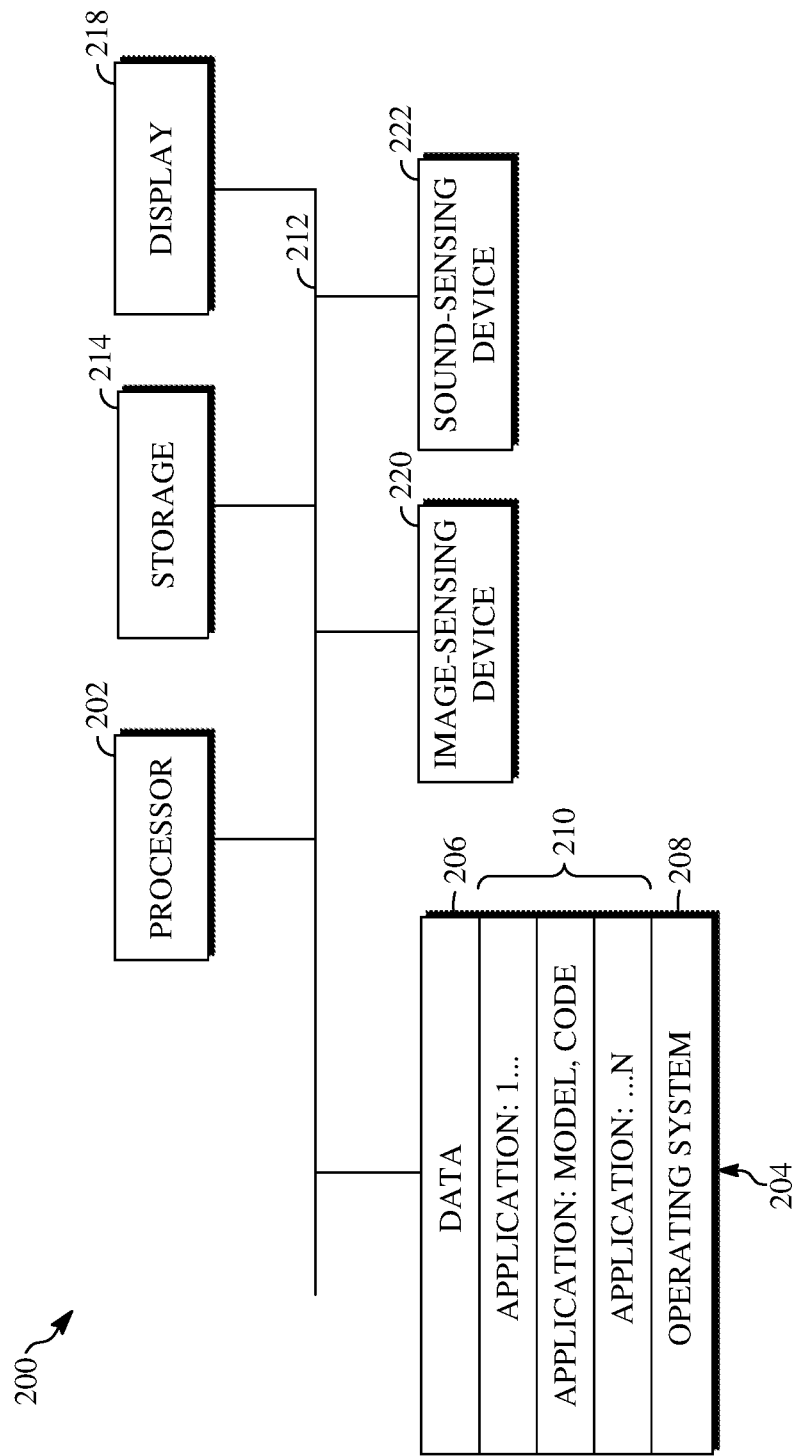
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a machine learning model production application and/or a video stream transcoding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
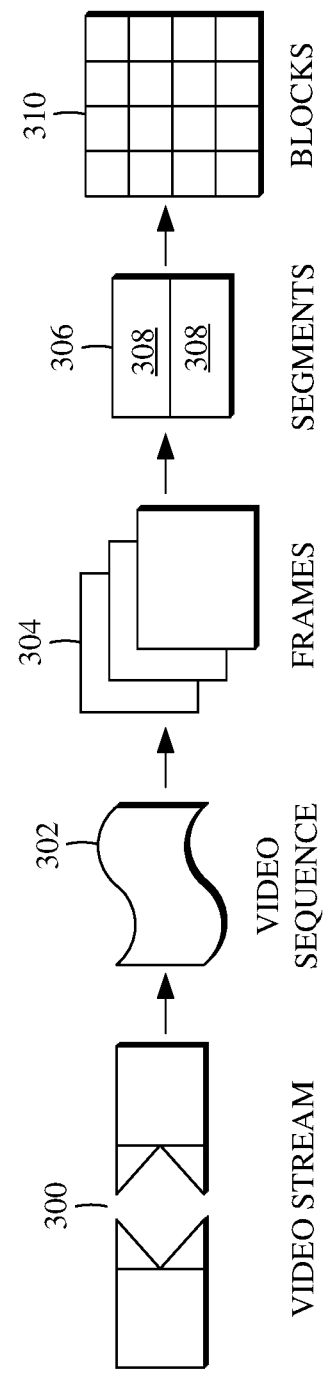
FIG. 3 is a diagram of an example of a video stream to be encoded and decoded.

FIG. 3 is a diagram of an example of a video stream 300 to be encoded and decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
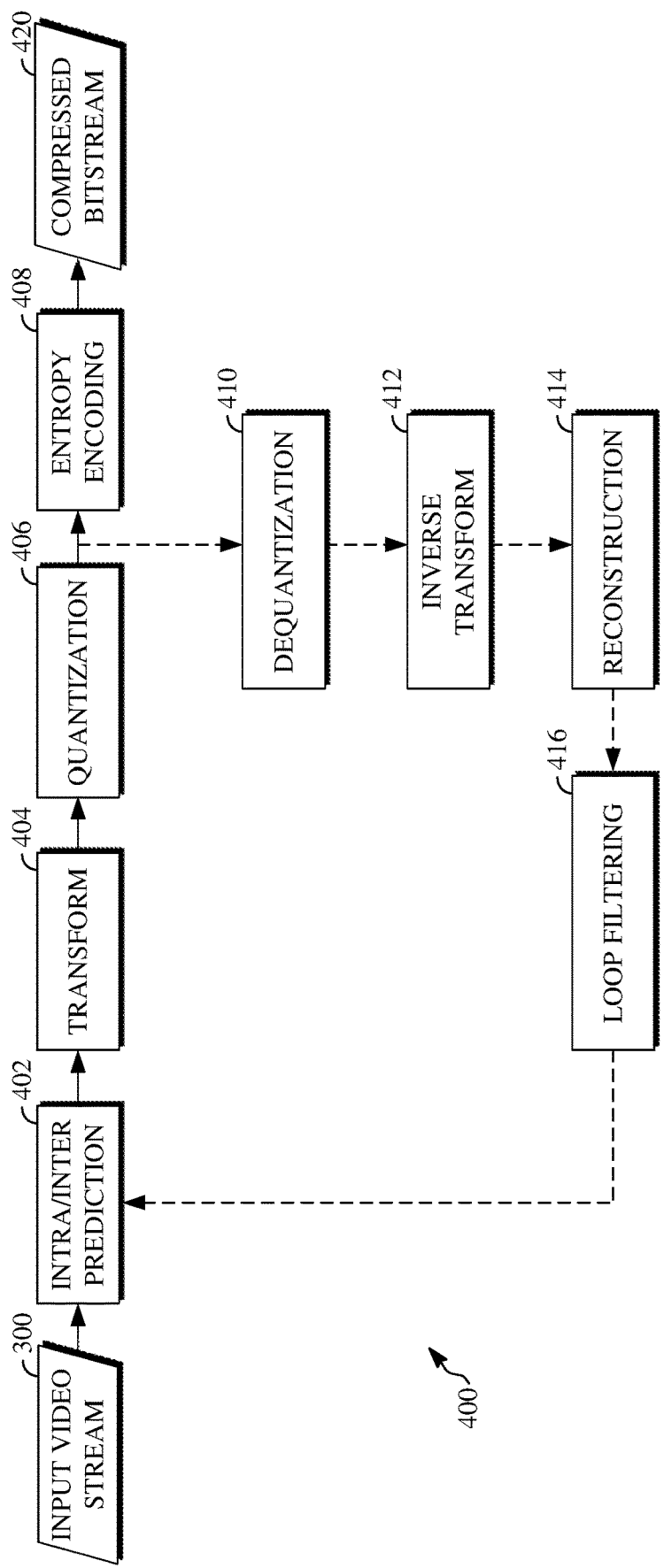
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

In some cases, the functions performed by the encoder 400 may occur after a filtering of the video stream 300. That is, the video stream 300 may undergo pre-processing according to one or more implementations of this disclosure prior to the encoder 400 receiving the video stream 300. Alternatively, the encoder 400 may itself perform such pre-processing against the video stream 300 prior to proceeding to perform the functions described with respect to FIG. 4, such as prior to the processing of the video stream 300 at the intra/inter prediction stage 402.

When the video stream 300 is presented for encoding after the pre-processing is performed, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters which may be applied at the loop filtering stage 416 include, without limitation, a deblocking filter, a directional enhancement filter, and a loop restoration filter.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
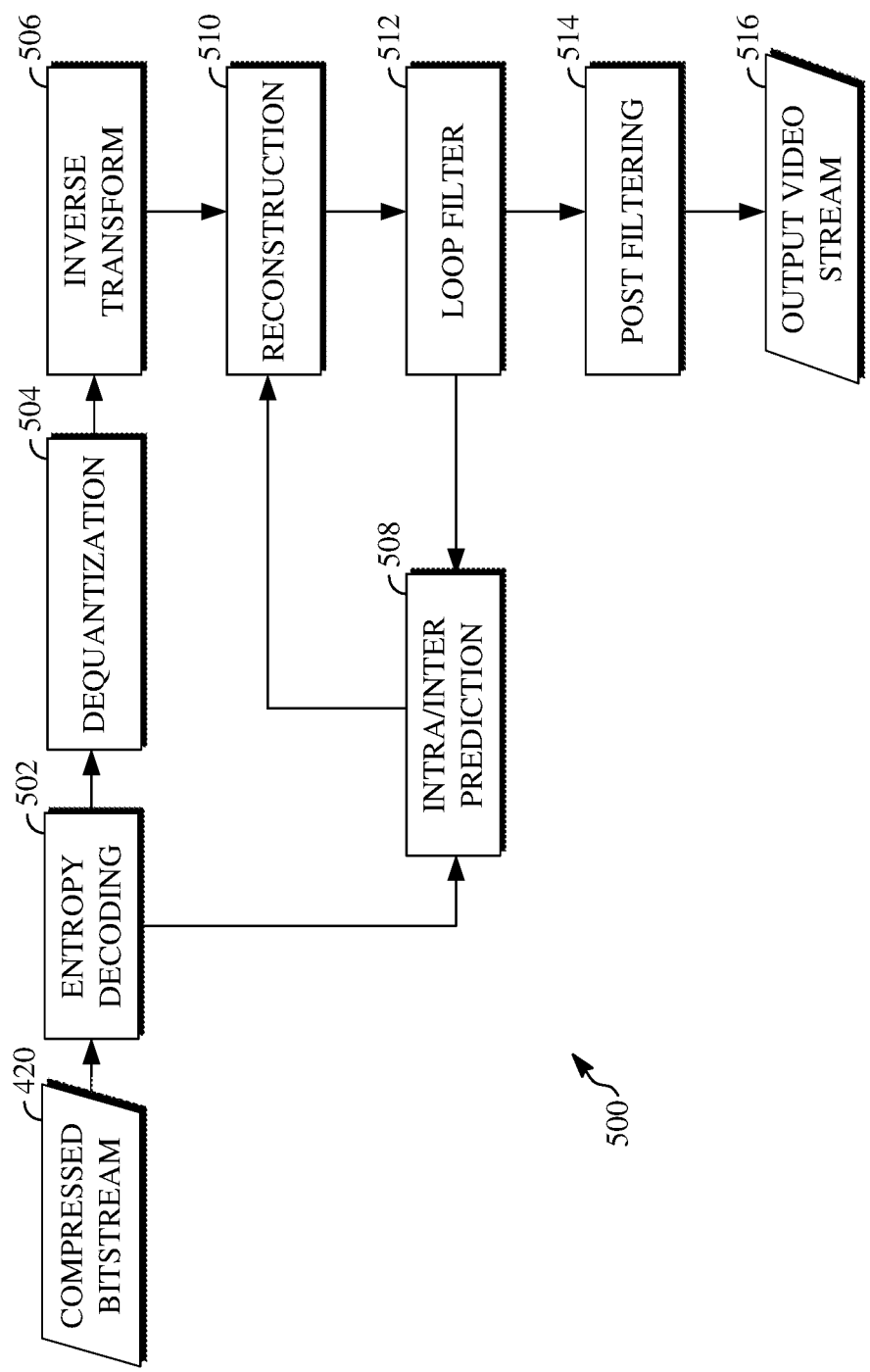
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Examples of filters which may be applied at the loop filtering stage 512 include, without limitation, a deblocking filter, a directional enhancement filter, and a loop restoration filter. Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514 or otherwise omit the post filter stage 514.

Figure 6:
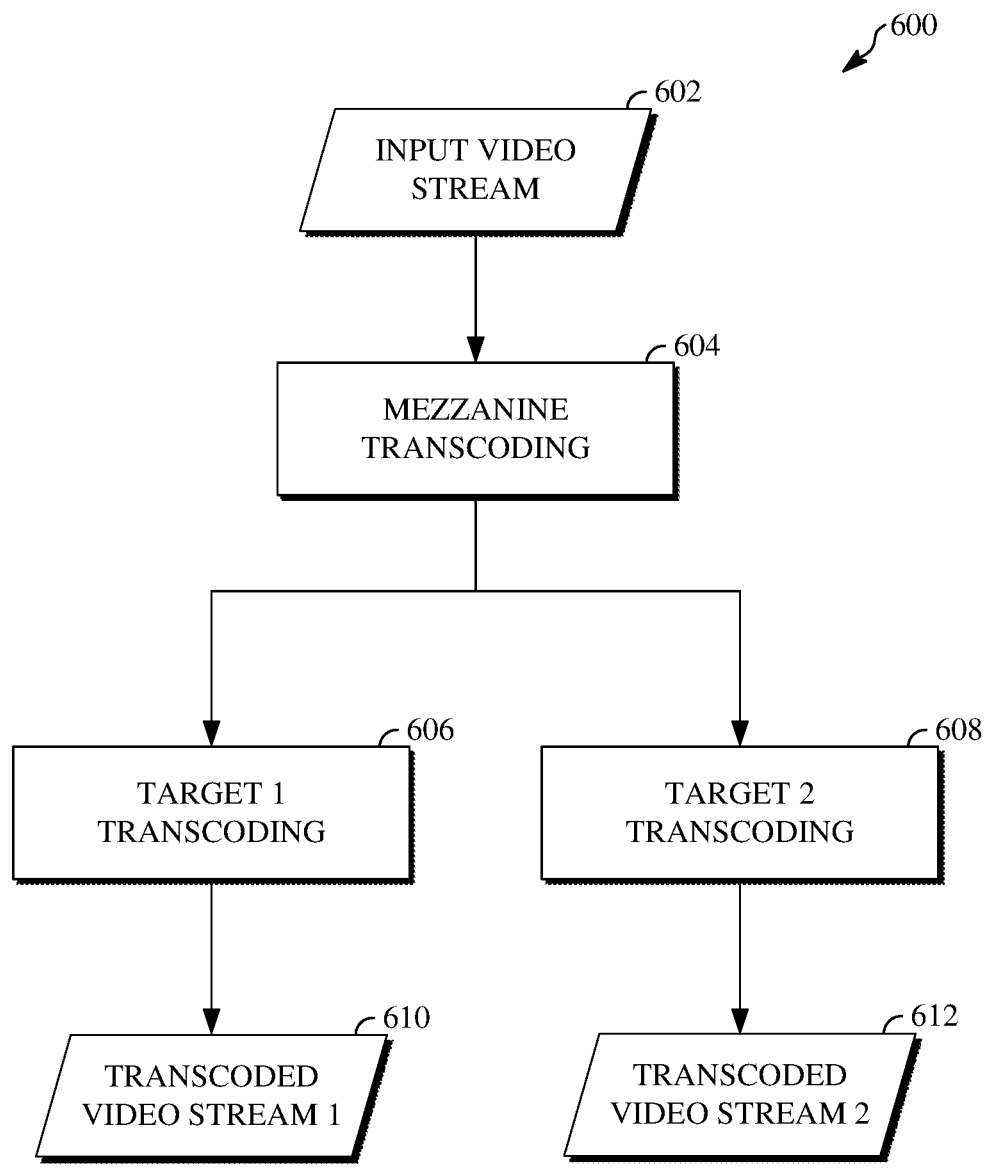
FIG. 6 is a block diagram of an example of a video transcoder.

FIG. 6 is a block diagram of an example of a transcoder 600. The transcoder 600 can be implemented in the transmitting station 102, such as by providing a computer software program stored in memory, for example, the memory 204. The computer software program can include machine instructions that, when executed by a processor such as the processor 202, cause the transmitting station 102 to transcode video data in the manner described in FIG. 6. The transcoder 600 can also be implemented as specialized hardware included in, for example, the transmitting station 102. In some implementations, the transcoder 600 can be or represent functionality performed in connection with an encoder, such as the encoder 400 shown in FIG. 4. In some implementations, the encoder 400 and the transcoder 600 can be combined into a single computer software program.

The transcoder 600 represents a transcoding pipeline that receives an input video stream 602 and transcodes the input video stream 602 to produce transcoded content. The input video stream 602 may, for example, be the video stream 300 shown in FIG. 4. A mezzanine transcoding stage 604 uses the input video stream 602 to produce a mezzanine representing a universal high quality version of the video content of the input video stream 602.

The output of the mezzanine transcoding stage 604 can be used to produce transcoded video streams at different target bitrates. Accordingly, the transcoder 600 may include one or more target transcoding stages. In the example shown, the transcoder 600 includes a target 1 transcoding stage 606 and a target 2 transcoding stage 608. The target 1 transcoding stage 606 uses certain bitrate settings to produce a transcoded video stream 1 610 based on the input video stream 602. The target 2 transcoding stage 608 uses other bitrate settings to produce a transcoded video stream 2 612 based on the input video stream 602.

Each of the transcoded video stream 1 610 and the transcoded video stream 2 612 may be or otherwise represent an output bitstream, which may, for example, be the compressed bitstream 420 shown in FIGS. 4 and 5. The output bitstream may be output or stored for further processing, for example, using a decoder, such as the decoder 500 shown in FIG. 5. In some implementations, the transcoder 600 may include a single transcoding stage usable to produce transcoded video streams according to multiple different bitrate settings.

Where the transcoder 600 uses fixed compression parameters, the mezzanine transcoding stage 604 uses those same fixed compression parameters for all input video streams processed thereat. As a result of such fixed compression parameter usage, the target 1 transcoding stage 606 and the target 2 transcoding stage 608 may be limited in their processing ability, such as where the quality of the input video stream 602 is particularly high or low. Implementations and examples of variations of a transcoder which can transcode video streams using adaptive compression parameters are described below with respect to FIGS. 7 and 8.

Figure 7:
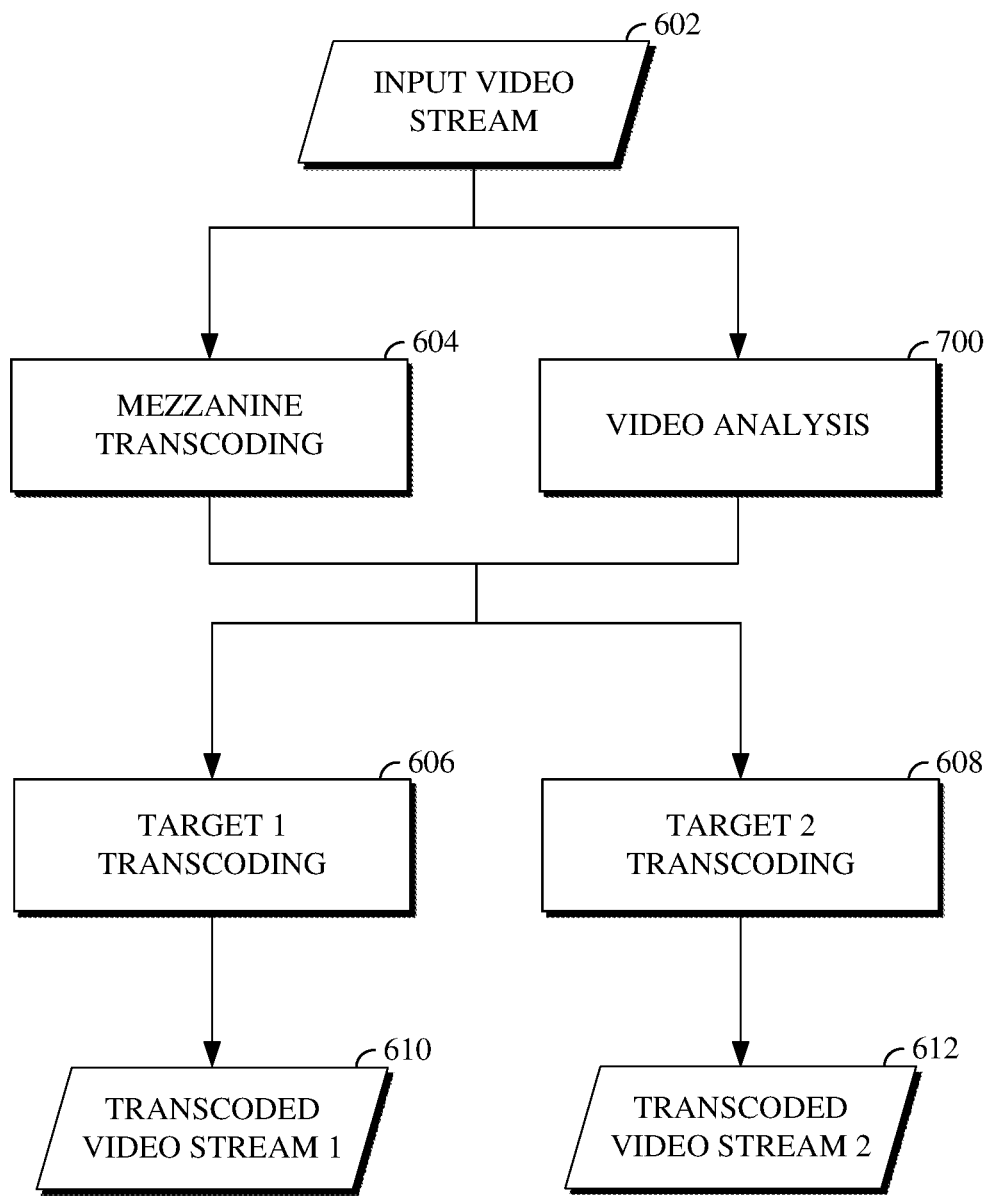
FIG. 7 is a block diagram of an example of a video transcoder that includes a video analysis stage for inference processing of video content using a machine learning model retrained for video quality assessment.

FIG. 7 is a block diagram of an example of a video transcoder that includes a video analysis stage for inference processing of video content using a machine learning model retrained for video quality assessment. As shown, the video transcoder described with respect to FIG. 7 is a variation of the transcoder 600 shown in FIG. 6. In some implementations, however, video transcoder described with respect to FIG. 7 may be another video transcoder.

As shown, the video transcoder of FIG. 7 receives the input video stream 602 shown in FIG. 6 as input and processes the input video stream 602 using the mezzanine transcoding stage 604 shown in FIG. 6 and a video analysis stage 700 to prepare same for target transcoding. The output of the mezzanine transcoding stage 604 and the output of the video analysis stage 700 are used as input to each of the target 1 transcoding stage 606 shown in FIG. 6 and the target 2 transcoding stage 608 shown in FIG. 6. The target 1 transcoding stage 606 produces the transcoded video stream 1 610 shown in FIG. 6 and the target 2 transcoding stage 608 produces the transcoded video stream 2 612 shown in FIG. 6. That is, each of the target 1 transcoding stage 606 and the target 2 transcoding stage 608 uses a transcoding stage which transcodes the input video stream 602 into transcoded content according to compression parameters, and which uses output of the video analysis stage 700 and output of the mezzanine transcoding stage 604 to transcode the input video stream 602 into transcoded content.

The video analysis stage 700 uses a machine learning model retrained for video quality assessment to determine the quality level of the video frames of the input video stream 602. The video analysis stage 700 then selects a set of adaptive compression parameters to use for transcoding the input video stream 602 based on the quality level. In some implementations, the video analysis stage 700 processes only some of the video frames of the input video stream to determine the quality level and select the set of adaptive compression parameters. In some implementations, the video analysis stage 700 processes all video frames of the input video stream to determine the quality level and select the set of adaptive compression parameters.

The machine learning model used by the video analysis stage 700 may, for example, be retrained using transfer learning. For example, the machine learning model used at the video analysis stage 700 may initially be trained for image object detection using a training data set, such as to produce a machine learning model which can detect objects within video frames. The machine learning model may then be retrained using a first retraining data set to produce a machine learning model which can assess the technical content of a video (e.g., of individual video frames or of all or part of a video stream). The machine learning model may then be further retrained using a second retraining data set to produce a machine learning model which can assess the quality of a video, such as based on artifacts introduced within some or all video frames during compression. Implementations and examples for using transfer learning to produce the machine learning model retrained for video quality assessment are described below with respect to FIGS. 9-11.

The video analysis stage 700 and the mezzanine transcoding stage 604 each separately processes the input video stream 602. The video analysis stage 700 completes its processing of the input video stream 602 prior to the completion of processing of the input video stream 602 at the mezzanine transcoding stage 604. The parallel processing of the input video stream 602 for mezzanine transcoding and for quality assessment, respectively at the mezzanine transcoding stage 604 and the video analysis stage 700, does not introduce additional latency into the transcoding pipeline (e.g., as compared to a transcoder without the video analysis stage 600, for example, the transcoder 600).

The video analysis stage 700 is unblocked from the mezzanine transcoding stage 604. As such, in the event of a network or other failure preventing the video analysis stage 700 from determining the quality level of the video frames of the input video stream 602 and/or from selecting adaptive compression parameters to use for transcoding the input video stream 602, the input video stream 602 can still be transcoded using the target 1 transcoding stage 606 or the target 2 transcoding stage 608, such as based on the output of the mezzanine transcoding stage 604 and without output from the video analysis stage 700.

Figure 8:
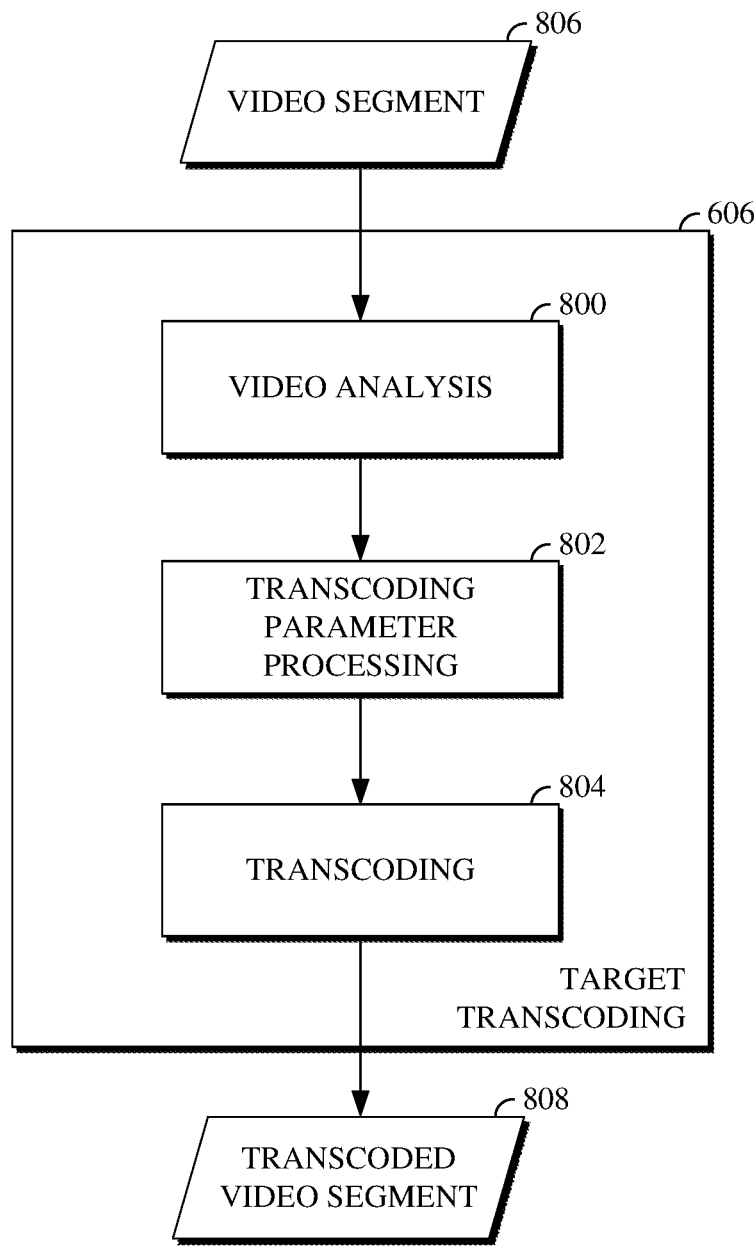
FIG. 8 is a block diagram of an example of a target transcoding stage that includes a video analysis stage for inference processing of video content using a machine learning model retrained for video quality assessment.

FIG. 8 is a block diagram of an example of a target transcoding stage that includes a video analysis stage 800 for inference processing of video content using a machine learning model retrained for video quality assessment. As shown, the video analysis stage 800 is the video analysis stage 700 shown in FIG. 7. However, in some implementations, the video analysis stage 800 may be another video analysis stage.

As shown, the target transcoding stage is the target 1 transcoding stage 606 shown in FIG. 6. However, in some implementations, the target transcoding stage may instead be the target 2 transcoding stage 608 shown in FIG. 6 or another target transcoding stage. The target transcoding stage 606 includes the video analysis stage 800, as well as a transcoding parameter processing stage 802 and a transcoding stage 804.

The video analysis stage 800 is or otherwise corresponds to a library usable in target transcoding of an input video stream (e.g., the input video stream 602 shown in FIGS. 6 and 7). The library includes software functionality for making calls to, receiving output from, and/or otherwise using a machine learning model which has been retrained for video quality assessment. Because the video analysis stage 800 processes the input in a pipeline pathway rather than separately from a mezzanine transcoding stage (e.g., the mezzanine transcoding stage 604 shown in FIGS. 6 and 7).

The video analysis stage 800 receives, as input, a video segment 806 representing some or all of the input video stream. The video segment 806 may, for example, be a mezzanine chunk of an input video stream. The mezzanine chunk includes some video frames of the input video stream. The video analysis stage 800 processes the video segment to determine the quality of the video frames thereof and to select adaptive compression parameters to use for transcoding the corresponding input video stream.

In some implementations, the video analysis stage 800 processes the video segment 806 and/or another portion or all of an input video stream to determine whether a quality level of video frames thereof meetings a threshold. For example, the threshold may correspond to a quality measurement which, if not met, indicate that default compression parameters for transcoding the input video stream should be increased.

Responsive to a determination that the quality level of the video frames of the input video stream meets the threshold, default compression parameters are used for transcoding the input video stream. Responsive to a determination that the quality level of the video frames of the input video stream does not meet the threshold, the default compression parameters are adjusted for transcoding the input video stream. In some implementations, adjusting the default compression parameters includes increasing a CRF for the input video stream.

The transcoding parameter processing stage 802 uses the selecting of adaptive compression parameters output by the video analysis stage 800 to prepare the video segment 806 for transcoding. The transcoding state 804 then transcodes the video segment 806 according to the selected adaptive compression parameters to produce a transcoded video segment 808. In some implementations, the transcoding stage 804 can transcode the input video stream corresponding to the video segment 806 to produce a transcoded video stream (e.g., the transcoded video stream 1 610 shown in FIGS. 6 and 7). For example, the transcoding stage 804 can transcode the entire input video stream according to adaptive compression parameters selected based on the processing of the video segment 806. In some implementations, the transcoding parameter processing stage 802 and the transcoding stage 804 can be combined into a single transcoding stage.

Figure 9:
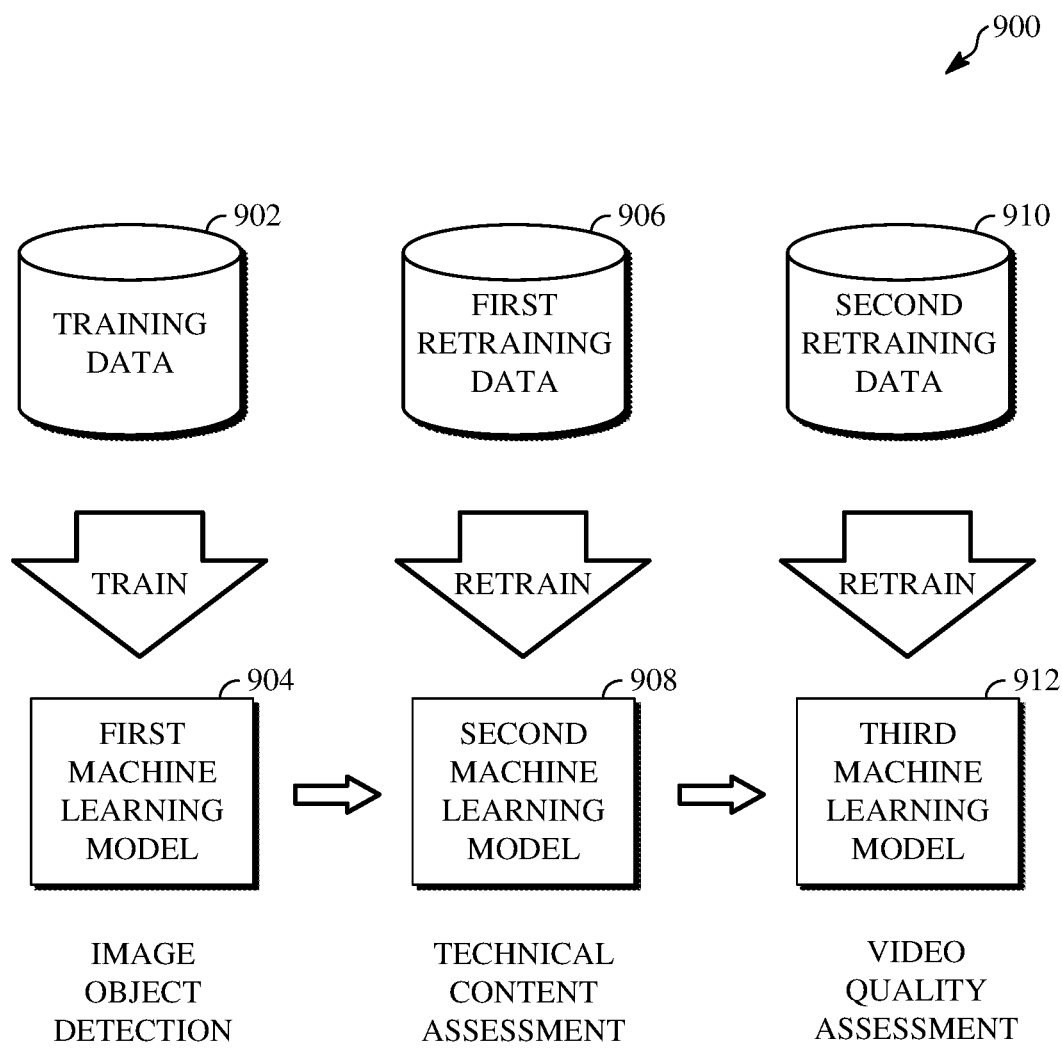
FIG. 9 is a schematic of an example of a transfer learning system for retraining a machine learning model for video quality assessment.

FIG. 9 is a schematic of an example of a transfer learning system 900 for retraining a machine learning model for video quality assessment. As shown, training data set 902 is used to produce a first machine learning model 904. Producing the first machine learning model 904 using the training data set 902 includes training a new model according to samples of the training data set 902. The first machine learning model 904 is trained for image object detection. For example, the first machine learning model 904 may be an image classification model used to extract basic image features. In such an example, the training data set 902 may be a JFT dataset.

A first retraining data set 906 is used to produce a second machine learning model 908. Producing the second machine learning model 908 includes retraining the first machine learning model 904 according to samples of the first retraining data set 906. The second machine learning model is retrained for technical content assessment. For example, the second machine learning model 908 may learn technical content features of images (e.g., video frames). In such an example, the first retraining data set 906 may be a visual quality dataset may include a number of images which are paired to form samples.

A second retraining data set 910 is used to produce a third machine learning model 912. Producing the third machine learning model 912 includes retraining the second machine learning model 908 according to samples of the second retraining data set 910. The third machine learning model 912 is retrained for video quality assessment. For example, the third machine learning model 912 may learn about issues involved with the compression of user generated content, such as video content represented by input video streams including video frames. For example, the issues involved with compression which the third machine learning model 912 may learn may relate to artifacts introduced within some or all video frames of a video stream during a compression of the video stream. In such an example, the second retraining data set 910 may be a user generated content dataset used in and/or generated using a pairwise training system. Implementations and examples of a pairwise training system are described below with respect to FIG. 10.

In some implementations, the second retraining data 910 includes two sets of user generated content samples. For example, the first set may include a number of frames (e.g., 1,500) extracted from user generated video content, such as where one or two frames are extracted from each video, and the second set may include pairs of frames which are identified, selected, or otherwise generated without manual intervention.

Each of the frames of the first set may be randomly paired with a number of frames (e.g., 7) from other videos. The pairs of frames may be evaluated for quality, such as by a visual or psychovisual comparison between the frames comprising a given pair of frames. The output of the comparison is an indication of which of the two frames in the given pair of frames is of a higher quality. The context of quality uses an understanding of what objects should look like as a foundation for quality. For example, if an object should be circular, but instead has sharp corners, the quality of an image including that object is probably low.

In some implementations, some or all of the pairs of frames may be presented for manual review. For example, the manual review for a given pair of frames may include a reviewer determining which frame of the pair of frames demonstrates more of a given visual quality, which may be a subjectively good or bad or an objectively good or bad quality. For example, the quality may refer to glaring, sharpness, resolution, or the like.

The output of the comparison between the two frames of the given pair of frames during manual review may be referred to as a user rating that indicates which of the two frames is of a higher quality. Generally, the higher quality frame of the two will be the one which demonstrates either more good visual qualities or fewer bad visual qualities. Manual review of pairs of frames may include having multiple users review and provide output for some or all of the pairs of frames, such as to receive and later process output for the same pairs of frames from multiple users.

In some implementations, the processing of some or all of the pairs of frames may instead be automated by a psychovisual model. The psychovisual model may be a software model which is trained based on the perceptibility of visual objects or other image data. For example, the psychovisual model may apply a ruleset to some or all frames to assess the image quality thereof.

In some such implementations, the rules used by the psychovisual model may relate to the application of gamma processing to color channels of the frame, the measurements of high frequency changes in blue color data, the amount of visual noise within a frame generally and/or identified with respect to specific image objects detected within the frame, and/or the like.

The output of the pairwise frame comparison, whether by manual review, using a psychovisual model, or otherwise performed, may be include a list of rankings for some or all of the frames which were compared. In some implementations, the rankings may be selected by the reviewer or model, as applicable, from a permissible range of ranking values, such as where any ranking in the range of M to N is available (in which M and N are different values). In some implementations, the rankings may be selected by the reviewer, or model, from a list of predefined ranking values. For example, the predefined ranking values may correspond to CRF parameters which may be optimal for processing the respective frames.

The transfer learning system 900 thus is used for retraining a model based on various data sets, such as because the original data set is not sufficient to achieve reliable results for a different purpose. For example, the function of image object detection for which the first machine learning model 904 is trained is a different purpose than the function of video quality assessment for which the third machine learning model 912 is retrained. However, because baseline features are shared at a low level between the two purposes, transfer learning is leveraged to improve the performance of the first machine learning model 904, such as by the retraining disclosed herein.

Figure 10:
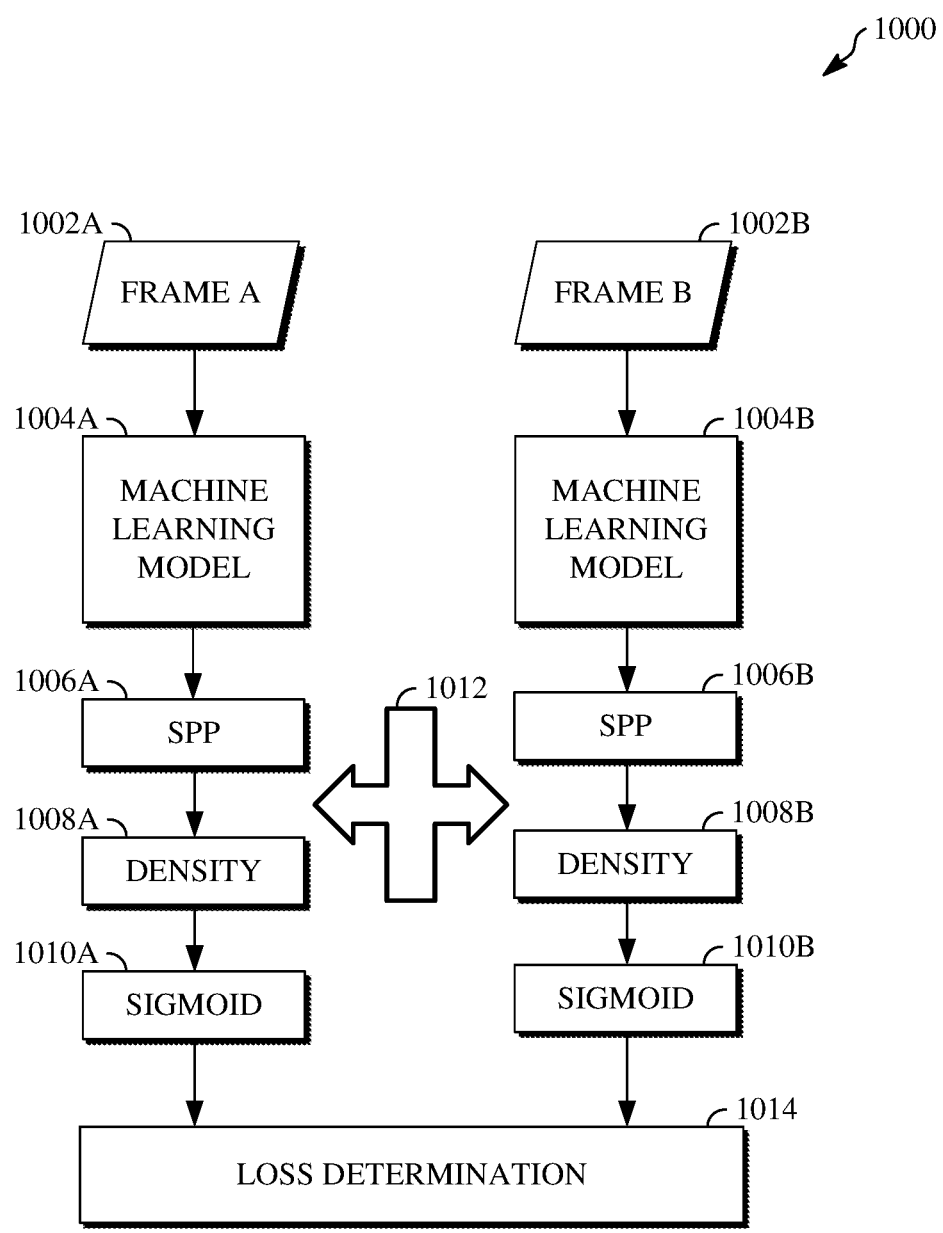
FIG. 10 a schematic of an example of a pairwise training system for producing a machine learning model for video quality assessment.

FIG. 10 a schematic of an example of a pairwise training system 1000 for producing a machine learning model for video quality assessment. The pairwise training system 1000 is used to retrain a machine learning model, such as based on the output of pairwise frame comparisons of user generated content. In the example shown, a frame pair including a Frame A 1002A and a Frame B 1002B are used as input to the pairwise training system 1000. For example, the Frame A 1002A and the Frame B 1002B may be frames of the second retraining data set 910 shown in FIG. 9.

In some implementations, the Frame A 1002A and the Frame B 1002B may include the partially or wholly or similar image objects. In some implementations, the Frame A 1002 and the Frame B 1002B may include partially or wholly different image objects. In some implementations, such as where the machine learning model produced using the pairwise training system 1000 is being retrained using a retraining data set including two sets of samples, the Frame A 1002A may be a frame from a first set and the Frame B 1002B may be a frame from a second set.

The Frame A 1002A is processed using a retrained machine learning model 1004A and the Frame B 1002B is processed using a retrained machine learning model 1004B. The retrained machine learning models 1004A and 1004B refer to copies or instances of a machine learning model, which may, for example, be the second machine learning model 908 shown in FIG. 9 or another machine learning model. In some implementations, the retrained machine learning models 1004A and 1004B may refer to a single copy or instance of a retrained machine learning model.

The retrained machine learning models 1004A and 1004B are respectively used to process the Frame A 1002A and the Frame B 1002B. A final output of the pairwise training system 1000, such as based on the processing of the Frame A 1002A using the retrained machine learning model 1004A and based on the processing of the Frame B 1002B using the retrained machine learning model 1004B, is used to further retrain the retrained machine learning models 1004A and 1004B.

Spatial Pyramid Pooling (SPP) layers 1006A and 1006B allow inferencing with video frames of arbitrary sizes. The SPP layers 1006A and 1006B enables interfacing with frames of user generated content of varying sizes. For example, the SPP layers 1006A and 1006B may perform a pooling across different frame resolutions respectively for the Frame A 1002A and the Frame B 1002B, and/or for other frames. At each resolution, the SPP layers 1006A and 1006B pools a fixed number of pixels such that, if the resolution of a given frame is increased or decreased, the understanding of the frame at the increased or decreased resolution will have already been processed.

Density layers 1008A and 1008B perform density estimation against estimates observed for the Frame A 1002A and the Frame B 1002B using the retrained machine learning models 1004A and 1004B, respectively, after processing at the SPP layers 1006A and 1006B. Sigmoid layers 1010A and 1010B use sigmoid function processing for activation processing of components (e.g., in some implementations, of neurons) of the retrained machine learning models 1004A and 1004B after processing at the density layers 1008A and 1008B.

Weight sharing functionality 1012 enables the sharing of information between some or all of the SPP layers 1006A and 1006B, the density layers 1008A and 1008B, and/or the sigmoid layers 1010A and 1010B. For example, weights shared using the weight sharing functionality 1012 may include or otherwise relate to values, variables, or other information determined, identified, generated, or otherwise processed at one or more of an SPP layer, a density layer, or a sigmoid layer. The weight sharing functionality 1012 may thus enable consistency in the retraining of the retrained machine learning models 1004A and 1004B, such as by the sharing of information processed during each of the Frame A and Frame B pathways. In some implementations, the weight sharing functionality 1012 may be omitted.

A loss determination layer 1014 uses the output of the SPP layers 1006A and 1008B, the output of the density layers 1008A and 1008B, and the output of the sigmoid layers 1010A and 1010B to produce output representing a measurement of the cross entropy loss information for and between and rank loss information for and between the Frame A 1002A and the Frame B 1002B. The cross entropy loss information refers to a measurement in the performance of classification performed using the retrained machine learning models 1004A and 1004B.

The rank loss information refers to a measurement in a change in ranking of image quality by the retrained machine learning models 1004A and 1004B, such as compared to initial rankings given for the same or similar video frames during a pairwise comparison, for example, as described above with respect to FIG. 9. In particular, the rank loss information for a given video frame or pair of frames may be determined by comparing a ranking determined using the retrained machine learning models 1004A and 1004B against an earlier ranking given during the pairwise training. When those rankings are not the same, the comparison indicates a measurement of rank loss in one direction.

The output of the loss determination layer 1014 may in one example be expressed as Loss (Xi, Xj), where Xi represents the Frame A 1002A and Xj represents the Frame B 1002B. The output of the loss determination layer 1014 is used to retrain a machine learning model corresponding to the copies or instances represented by the machine learning models 1004A and 1004B. For example, the output of the loss determination layer 1014 may represent changes in weights for the machine learning models 1004A and 1004B.

For example, initial weights (e.g., filter values or other components of the machine learning models 1004A and 1004B) may initially be set by the earlier training and/or retraining of the machine learning models 1004A and 1004B (e.g., using the training data set 902 and/or the first retraining data set 906 shown in FIG. 9). Retraining the machine learning models 1004A and 1004B may thus include changing the weights thereof according to the cross entropy loss and the rank loss output by the loss determination layer 1014.

Figure 11:
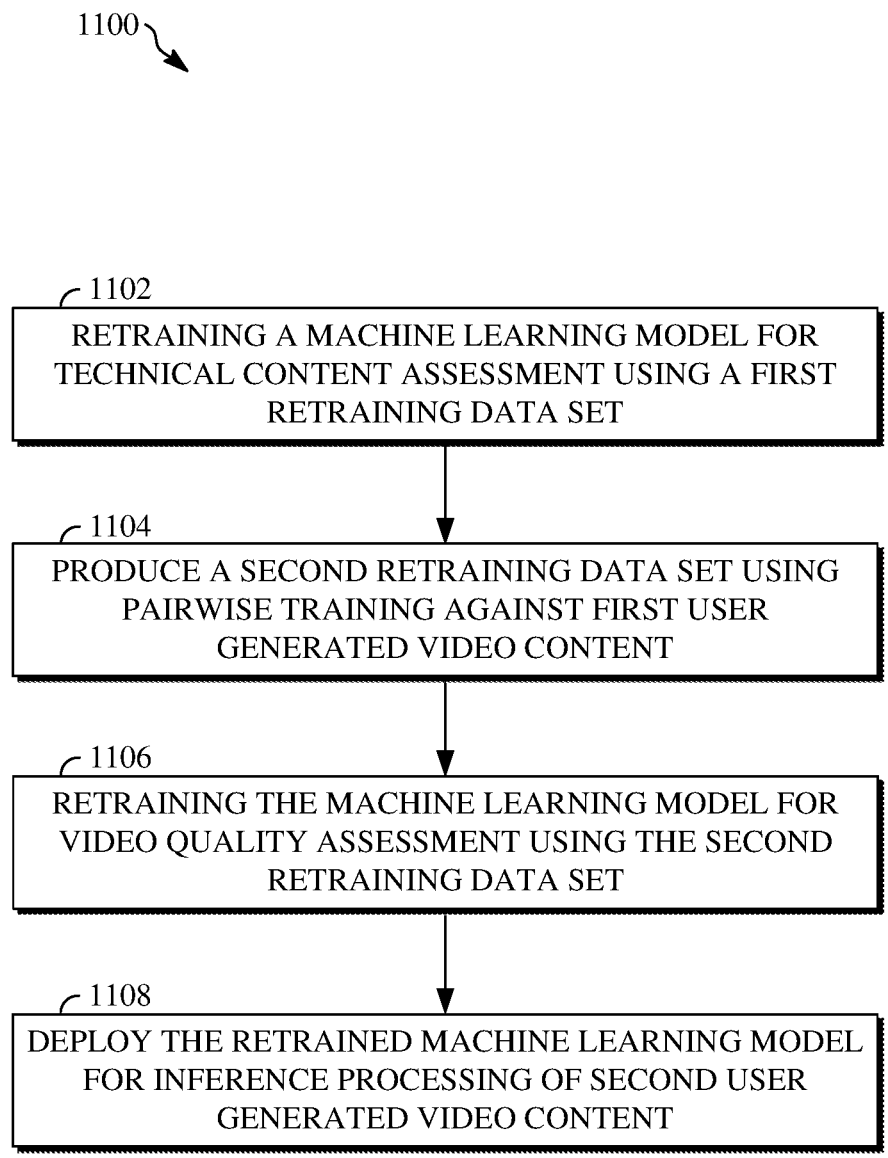
FIG. 11 is a flowchart diagram of an example of a technique for using transfer learning to retrain and deploy a machine learning model for video quality assessment.
Figure 12:
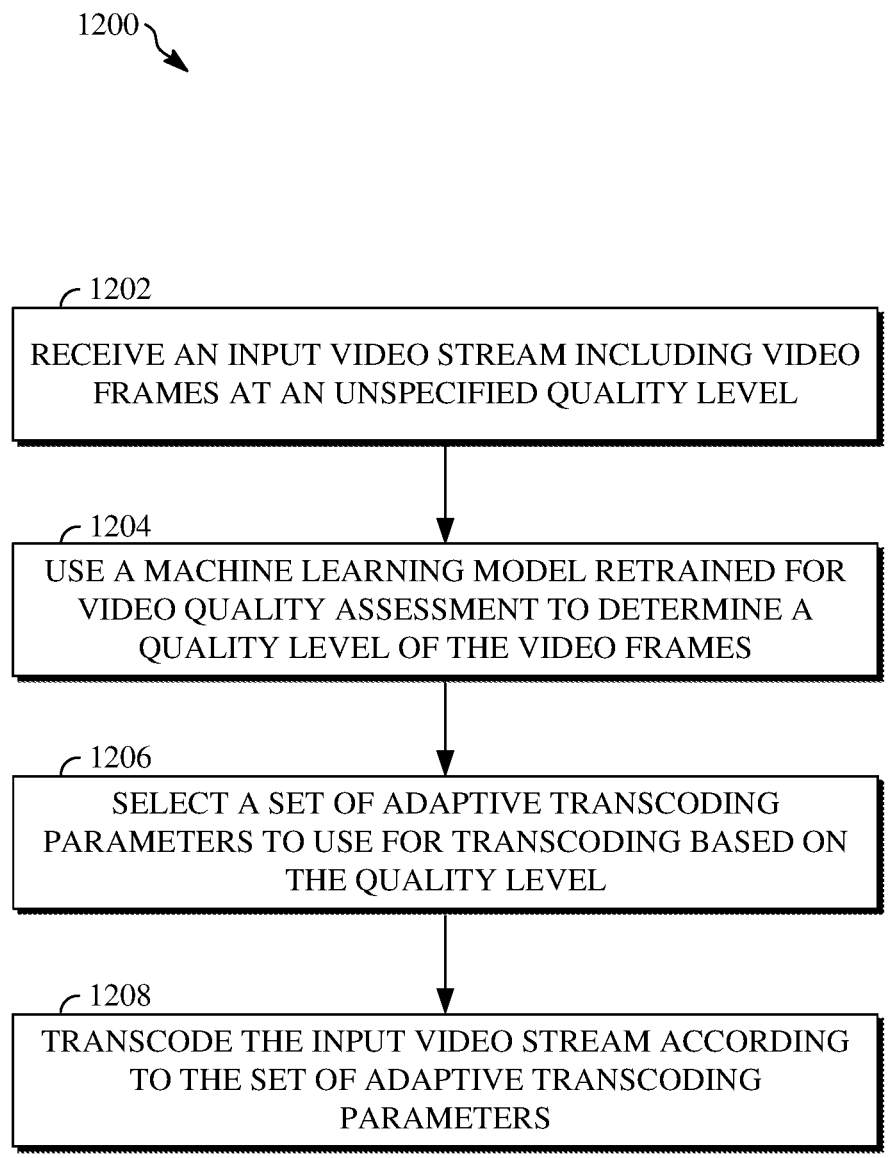
FIG. 12 is a flowchart diagram of an example of a technique for inference processing of an input video stream using a machine learning model retrained for video quality assessment.

Further details of techniques for retraining models for video quality assessment and for transcoding using the retrained models are now described. FIG. 11 is a flowchart diagram of an example of a technique 1100 for using transfer learning to retrain and deploy a machine learning model for video quality assessment. FIG. 12 is a flowchart diagram of an example of a technique 1200 for inference processing of an input video stream using a machine learning model retrained for video quality assessment.

The technique 1100 and/or the technique 1200 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 1100 and/or the technique 1200. The technique 1100 and/or the technique 1200 can be implemented using specialized hardware or firmware. For example, a hardware component configured to perform the technique 1100 and/or the technique 1200. As explained above, some computing devices may have multiple memories or processors, and the operations described in the technique 1100 and/or the technique 1200 can be distributed using multiple processors, memories, or both.

For simplicity of explanation, the techniques 1100 and 1200 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 11, the technique 1100 for using transfer learning to retrain and deploy a machine learning model for video quality assessment is shown. At 1102, a trained machine learning model is retrained for technical content assessment using a first retraining data set. The trained machine learning model is initially trained for image object detection using a training data set. The machine learning model is retrained using a first retraining data set. The first retraining data set may, for example be the first retraining data set 906 shown in FIG. 9. The machine learning model initially trained using the training data set may in at least some cases be considered a first machine learning model. The machine learning model after retraining using the first retraining data set may in at least some cases be considered a second machine learning model.

At 1104, a second retraining data set is produced. The second retraining data set corresponds to first user generated video content. The second retraining data set may, for example, be the second retraining data set 910 shown in FIG. 9. The first user generated video content may, for example, be one of the sample sets of the second retraining data set 910. Each sample of the second retraining data set includes a pair of video frames including a first video frame at a first quality level and a second video frame at a second quality level.

The second retraining data may be produced using pairwise training against the first user generated video content. For example, producing the second retraining data set may include extracting video frames from each of a first set of the first user generated video content and a second set of the first user generated video content. Each of the video frames extracted from the first set of the first user generated content may then be paired with each of one or more video frames extracted from the second set of the first user generated content. In some implementations of the technique 1100, the first video frame and the second video frame of at least some of the pairs of video frames include different image data.

At 1106, the machine learning model which was retrained using the first retraining data set is retrained for video quality assessment using the second retraining data set. Retraining the machine learning model for video quality assessment using the second retraining data set may include generating rank loss information representing rankings of quality measures of video frames of the second retraining data set. The machine learning model may then be trained to recognize different video content quality levels using the rank loss information. The machine learning model after retraining using the second retraining data set may in at least some cases be considered a third machine learning model.

Generating the rank loss information may, for example, include receiving, for each pair of video frames of the second retraining data set, an indication of which of the first video frame or the second video frame represents a higher value of one or more image assessment criteria. The rank loss information for the second retraining data set may then be generated using the indications received for each of the pairs of video frames. Training the machine learning model to recognize the different video content quality levels using the rank loss information may, for example, include training the machine learning model using the rank loss information and using cross entropy loss information produced for each pair of video frames of the second retraining data set.

Retraining the machine learning model for video quality assessment using the second retraining data set may include using SPP to train the machine learning model to recognize different sizes of video frames for the video quality assessment. For example, the SPP can be used to process the input video stream, either wholly or partially, to pool same across various frame resolutions. This processing introduces to the system performing the technique 1100 an understanding of how the further processing of the input video stream will change based on an increase or decrease in a resolution thereof.

At 1108, the machine learning model retrained using the second retraining data set is deployed for inference processing of second user generated video content. The deployment of the machine learning model may be according to the structure set forth in FIG. 7, the structure set forth in FIG. 8, or another structure. Implementations and examples of inference processing of the second user generated video content are described below with respect to FIG. 12.

Referring next to FIG. 12, the technique 1200 for inference processing of an input video stream using a machine learning model retrained for video quality assessment is shown. At 1202, an input video stream is received. The input video stream includes video frames at an unspecified quality level. The input video stream may, for example, be the second user generated video content for which the retrained machine learning model is deployed, as described with respect to the technique 1100 of FIG. 11. Although the video frames may all share a common, unspecified quality level, in some implementations, some of the video frames may have different, unspecified quality levels from others of the video frames.

At 1204, a machine learning model retrained for video quality assessment is used to determine a quality level of the video frames. Determining the quality level of the video frames using the retrained machine learning model includes processing at least some of the video frames using the retuned weights of the retrained machine learning model to make a prediction of the quality for the video frames. In some implementations, the machine learning model may output a first value to indicate a prediction of high quality for the video frames or output a second value to indicate a prediction of non-high quality for the video frames. In some implementations in which the video frames do not share a single, unspecified quality level, the machine learning model can be used to determine each different quality level represented in the video frames. In some implementations, the machine learning model may determine the quality level for only some video frames of the input video stream. For example, the machine learning model may process a mezzanine chunk of video frames and determine a quality level based thereon.

At 1206, a set of adaptive compression parameters to use for transcoding the input video stream is selected based on the determined quality level of the video frames of the input video stream. The adaptive compression parameters include parameters corresponding to one or more of a CRF, a minimum bitrate, or a maximum bitrate to use for transcoding the input video stream. The set of adaptive compression parameters selected for transcoding the input video stream may be one of a number of sets of adaptive compression parameters available for transcoding.

Each of the sets of adaptive compression parameters may include different adaptive compression parameters. For example, a first set may have a CRF at a first value, whereas a second set may have a CRF at a second value. In another example, a first set may have a CRF at a first value, a minimum bitrate at a first value, and a maximum bitrate at a first value, and a second set may have a CRF at a second value, a minimum bitrate at the same first value as in the first set, and a maximum bitrate at a second value. Other arrangements of parameter values of the sets of adaptive compression parameters are possible.

At 1208, the input video stream is transcoded according to the selected set of adaptive compression parameters. For example, the selected set of adaptive compression parameters may indicate to use a value of a CRF which is higher than an initial CRF for the input video stream. In such a case, transcoding the input video stream according to the selected set of adaptive compression parameters may include adjusting an initial CRF for the input video stream according to the selected set of adaptive compression parameters. In some implementations, transcoding the input video stream may include compressing the input video stream according to the selected set of adaptive compression parameters. In some implementations, transcoding the input video stream may include processing the input video stream according to the selected set of adaptive compression parameters other than by compressing the input video stream.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400, the decoder 500, and the transcoder 600, or another encoder, decoder, or transcoder as disclosed herein) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102 can encode content into an encoded video signal and transmit the encoded video signal to the communications device. In turn, the communications device can then decode the encoded video signal. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for using transfer learning to retrain and deploy a machine learning model for video quality assessment, the method comprising:
    retraining a machine learning model to produce a second machine learning model for technical content assessment using a first retraining data set, wherein the machine learning model is initially trained for image object detection;
    retraining the second machine learning model to produce a third machine learning model for video quality assessment using a second retraining data set different from the first retraining data set, wherein the second retraining data set corresponds to first user generated video content, wherein each sample of the second retraining data set includes a pair of video frames including a first video frame at a first quality level and a second video frame at a second quality level; and
    transcoding an input video stream of second user generated video content using a transcoding pipeline including a first stage that uses the third machine learning model to select parameters based on a quality level determined for the input video stream, a second stage that transcodes the input video stream into a mezzanine format, and a third stage transcodes the input video stream from the mezzanine format into transcoded content according to the selected parameters, wherein the first stage completes processing of the input video stream before the second stage completes processing of the input video stream.

2. The method of claim 1, further comprising:
    producing the second retraining data set by:
        extracting video frames from each of a first set of the first user generated video content and a second set of the first user generated video content; and
        pairing each of the video frames extracted from the first set of the first user generated video content with each of one or more video frames extracted from the second set of the first user generated content.

3. The method of claim 2, wherein retraining the second machine learning model to produce the third machine learning model for video quality assessment using the second retraining data set comprises:
    generating rank loss information representing rankings of quality measures of video frames of the second retraining data set; and
    training the third machine learning model to recognize different video content quality levels using the rank loss information.

4. The method of claim 3, wherein generating the rank loss information comprises:
    receiving, for each pair of video frames of the second retraining data set, an indication of which of the first video frame or the second video frame represents a higher value of one or more image assessment criteria; and
    generating the rank loss information for the second retraining data set using the indications received for each of the pairs of video frames.

5. The method of claim 4, wherein the indications for each of the pairs of video frames are produced using an automated psychovisual image assessment model.

6. The method of claim 3, wherein training the third machine learning model to recognize the different video content quality levels using the rank loss information comprises:
    training the third machine learning model using the rank loss information and using cross entropy loss information produced for each pair of video frames of the second retraining data set.

7. The method of claim 1, wherein the third machine learning model is a convolutional neural network and retraining the second machine learning model to produce the third machine learning model for video quality assessment using the second retraining data set comprises:
    using spatial pyramid pooling to train the third machine learning model to recognize different sizes of video frames for the video quality assessment.

8. The method of claim 1, wherein the first video frame and the second video frame of at least some of the pairs of video frames include different image data.

9. A method for inference processing of an input video stream using a machine learning model retrained for video quality assessment, the method comprising:
    retraining, using a first retraining data set, a first machine learning model initially trained for image object detection to produce a second machine learning model trained for technical content assessment;
    retraining, using a second retraining data set, the second machine learning model to produce the machine learning model;
    receiving the input video stream, wherein the input video stream includes video frames at an unspecified quality level; and transcoding the input video stream using a transcoding pipeline including a first stage, a second stage, and a third stage, wherein the first stage selects a set of one or more adaptive compression parameters to use for transcoding the input video stream based on a quality level determined for the video frames of the input video stream using the machine learning model, wherein the set of the one or more adaptive compression parameters is one of a plurality of sets of adaptive compression parameters, and wherein each of the sets of adaptive compression parameters corresponds to a different quality level to use for transcoding, wherein the second stage transcodes the input video stream to a mezzanine format; and wherein the third stage transcodes the input video stream in the mezzanine format according to the selected set of the one or more adaptive compression parameters, and wherein the first stage completes processing of the input video stream before the second stage completes processing of the input video stream.

10. The method of claim 9, wherein the second stage transcodes the input video stream according to the selected set of adaptive compression parameters by:

adjusting an initial constant rate factor for the input video stream according to the selected set of adaptive compression parameters.

11. The method of claim 9, wherein the one or more adaptive compression parameters include parameters corresponding to a constant rate factor, a minimum bitrate, and a maximum bitrate.

12. The method of claim 9, wherein the second retraining data set corresponds to first user generated video content and the input video stream is second user generated video content.

13. A system for using transfer learning to retrain and deploy a machine learning model for video quality assessment, the system comprising:

one or more processors configured to:

retrain a machine learning model to produce a second machine learning model for technical content assessment using a first retraining data set, wherein the machine learning model is initially trained for image object detection;

retrain the second machine learning model to produce a third machine learning model for video quality assessment using a second retraining data set different from the first retraining data set, wherein the second retraining data set corresponds to first user generated video content, wherein each sample of the second retraining data set includes a pair of video frames including a first video frame at a first quality level and a second video frame at a second quality level; and transcoding an input video stream of second user generated video content using a transcoding pipeline including a video analysis stage that uses the third machine learning model to select parameters based on a quality level determined for the input video stream, a mezzanine stage that transcodes the input video stream to a mezzanine format, and a transcoding stage that transcodes the input video stream in the mezzanine format into transcoded content according to the selected parameters, wherein the video analysis stage completes processing of the input video stream before the mezzanine stage completes processing of the input video stream.

14. The system of claim 13, wherein the system is configured to:

receive an input video stream including video frames at an unspecified quality level;

use the third machine learning model to determine a quality level of the video frames of the input video stream; and select, as the selected parameters, a set of one or more adaptive compression parameters to use for transcoding the input video stream based on the quality level determined using the third machine learning model, wherein the set of the one or more adaptive compression parameters is one of a plurality of sets of adaptive compression parameters, wherein each of the sets of adaptive compression parameters corresponds to a different quality level to use for transcoding.

15. The system of claim 13, wherein the transcoding stage uses output of the video analysis stage and output of the mezzanine stage to transcode the input video stream into the transcoded content.

16. The system of claim 13, wherein the transcoding stage includes the video analysis stage, and the video analysis stage is used as a library for target transcoding by the transcoding stage.

17. The system of claim 16, wherein the video analysis stage processes at least some of the input video stream to determine whether the quality level of the video frames of the input video stream meets a threshold.

18. The system of claim 17, wherein, responsive to a determination that the quality level of the video frames of the input video stream meets the threshold, default compression parameters are used for transcoding the input video stream, and, responsive to a determination that the quality level of the video frames of the input video stream does not meet the threshold, the default compression parameters are adjusted for transcoding the input video stream.

19. The system of claim 18, wherein, responsive to the determination that the quality level of the video frames of the input video stream does not meet the threshold, the default compression parameters are adjusted by increasing a constant rate factor for the input video stream.

20. The system of claim 13, wherein the third machine learning model is trained using spatial pooling.

* * * * *